(12) United States Patent
Villarreal-Trevino

(10) Patent No.: US 6,224,649 B1
(45) Date of Patent: *May 1, 2001

(54) METHOD AND APPARATUS FOR REDUCING IRON-OXIDES-PARTICLES HAVING A BROAD RANGE OF SIZES

(75) Inventor: Juan A. Villarreal-Trevino, Guadalupe (MX)

(73) Assignee: Hylsa, S.A. de C.V., Monterrey (MX)

(*) Notice: Subject to any disclaimer, the term of this patent is extended or adjusted under 35 U.S.C. 154(b) by 0 days.

This patent is subject to a terminal disclaimer.

(21) Appl. No.: 09/270,599

(22) Filed: Mar. 17, 1999

Related U.S. Application Data

(63) Continuation-in-part of application No. 09/165,985, filed on Oct. 2, 1998, now Pat. No. 6,132,489.
(60) Provisional application No. 60/091,869, filed on Jul. 6, 1998, and provisional application No. 60/093,103, filed on Jul. 16, 1998.

(51) Int. Cl.[7] .................................................... C21B 13/02
(52) U.S. Cl. .............................. 75/444; 75/451; 75/488; 75/505; 266/172
(58) Field of Search .............................. 75/444, 451, 488, 75/505; 266/172

(56) References Cited

U.S. PATENT DOCUMENTS

| | | | |
|---|---|---|---|
| 3,917,480 | 11/1975 | Malgarini et al. | 75/26 |
| 3,928,021 | 12/1975 | Matsubara . | |
| 3,936,296 | 2/1976 | Campbell | 75/26 |
| 4,082,545 | 4/1978 | Malgarini et al. | 75/35 |
| 4,248,623 | 2/1981 | Papst et al. . | |
| 4,886,246 | 12/1989 | Maeda et al. | 266/157 |
| 4,978,387 | 12/1990 | Kepplinger | 75/445 |
| 5,082,251 | 1/1992 | Whipp | 266/142 |
| 5,129,630 | 7/1992 | Ariyama et al. . | |
| 5,185,032 | 2/1993 | Whipp | 75/436 |
| 5,370,727 | 12/1994 | Whipp | 75/436 |
| 5,431,711 | 7/1995 | Meissner . | |
| 5,435,831 | 7/1995 | Meissner | 75/444 |
| 5,529,291 | 6/1996 | Meissner | 266/156 |
| 5,545,251 | 8/1996 | Knop | 75/444 |
| 5,560,762 | 10/1996 | Bresser et al. | 75/447 |
| 5,584,910 | 12/1996 | Kepplinger et al. | 75/445 |
| 5,647,887 | 7/1997 | Meissner . | |
| 5,762,681 | 6/1998 | Lee et al. | 75/446 |
| 5,919,281 | 7/1999 | Park . | |

*Primary Examiner*—Melvyn Andrews
(74) *Attorney, Agent, or Firm*—A. Thomas S. Safford; Frommer Lawrence & Haug LLP

(57) ABSTRACT

Methods and apparatus for the reduction into metallic iron of iron-oxides-containing particles having a broad range of sizes. Particles, typically within a broad range of sizes of about 0.1 mm to about 50 mm, are reduced by contact with a hot reducing gas, preferably from a horizontal gas distributor which defines the bottom of the reduction zone by supplying a uniform upflow of gas mainly composed of hydrogen (and/or carbon monoxide) within a temperature range of 650° C. to 1050° C. and at a velocity of about 0.5–0.7 m/s to fluidize at least some of the particles of a size of about 1.0 mm or less (when present). The reducing gas flows upwardly through a descending moving bed of coarser particles and forms thereabove a fluidized bed of fines, all in a single chamber in a reduction reactor, where the particles charged to the reactor are fed into the fluidized bed, preferably at the lower portion thereof at or near the interface with the moving bed, and the lighter reduced fluidized fines are withdrawn from the reactor from the upper portion of the fluidized bed. The spent reducing gas from the reactor passes through at least one cyclone separator with the fines entrained therein being normally returned to the reactor or optionally being subjected to a lower velocity fluidization in a separate reduction chamber of the reactor.

37 Claims, 5 Drawing Sheets

METHOD AND APPARATUS FOR REDUCING IRON-OXIDES-PARTICLES HAVING A BROAD RANGE OF SIZES

RELATED APPLICATIONS

This is a continuation-in-part of application Ser. No. 09/165,985 filed Oct. 2, 1998 now U.S. Pat. No. 6,132,489, which in turn was copending with and claims priority benefit from provisional applications No. 60/091,869, filed Jul. 6, 1998, and Ser. No. 60/093,103, filed Jul. 16, 1998.

FIELD OF THE INVENTION

The present invention describes a method and apparatus for the production of reduced iron ore, sponge iron (more commonly now referred to as Direct Reduced Iron or merely DRI), or the like, in an ironmaking plant wherein the charge of iron-oxide-containing particles fed to the reduction reactor can be in a form at least inclusive of fines. The invention in a preferred aspect particularly provides process and apparatus which has the ability to produce DRI, utilizing iron ore particles having a broad range of sizes (or the flexibility to handle any sub-range therein) without the necessity of prior screening, separate processing, and/or excessive equipment with poor performance typical of prior art attempts to handle both normal size pellets or lumps together with significant amounts of fines (which were subject to uneven reduction, loss of product fines, need for excessive capital structures or the like). These new methods and apparatus according to the present invention are particularly suitable for friable iron ore of the type which has a significant tendency to break apart and degrade during the reduction stage, causing clogging in the bed of particles in a moving bed reactor, resulting in disrupted gas flow patterns and consequent uneven reduction.

BACKGROUND OF THE INVENTION

Direct reduction plants for producing direct reduced iron, known as DRI or sponge iron, hot briquetted iron, or the like, (in general pre-reduced materials useful as feedstocks for iron and steelmaking), currently produce DRI by reacting a reducing gas, composed principally of hydrogen and carbon monoxide, at temperatures in the range of 750 to 1050° C., with a bed of particulate iron-containing material. Since the handling of feed materials produce variable quantities of iron ore fines, there has been a constant search for methods and apparatus which avoid the problems of processing fines in a conventional reactor shaft. The most common solution in the past has been to pelletize the fines to give a relatively easily handled particulate charge of quite uniform size (on the order of $\frac{3}{8}$ths of an inch). However, such pelletization adds to the cost of the overall process for the production of DRI. Also even pelletized ores include fines that are generated by the ordinary process handling of the pellets. If the pelletizing step could be eliminated (and instead use just ore lumps) without causing more problems than it solves, this would be very desirable.

DESCRIPTION OF THE PRIOR ART

The prior art discloses methods and apparatus for reducing iron ore in the form of pellets and/or lumps in a single reactor usually a vertical shaft furnace. These particles form a bed of iron-containing material which may be static (fixed bed) or may be descending by gravity (moving bed) within a reduction reactor. Examples of such processes are described in U.S. Pat. Nos. 3,749,386; 3,764,123; 3,816,101; 4,002,422; 4,046,557; 4,336,063; 4,375,983; 4,428,072; 4,556,417; 5,078,787; and 5,858,057. These and the other patents or patent applications cited in this application and their content are incorporated by reference.

It is well known to those skilled in the art that fines cause several problems when introduced into or produced in a moving bed reactor. Some of these problems are discussed in the patents described below.

U.S. Pat. No. 5,435,831 to Meissner shows a process capable of producing direct reduced iron from pellets, lumps and fines of iron oxide. However, this patent addresses the problem of fines in the DRI raw material merely by the previous separation of fines present in the feedstock from its coarser constituents (usually by means of a screen), followed by independent processing with the fines being reduced in a series of fluidized bed reactors, while the coarse particles are independently reduced in a conventional moving bed reactor. Even though this process can reduce lumps and pellets, as well as fines, it involves the combination of two separate systems using two types of separate reactors. Fines of the feedstock are separated by means of a screen.

This U.S. Pat. No. 5,435,831 discloses that if fines are introduced directly to the shaft reduction furnace, the fines would be blown out into the scrubber for separation from the gas stream (and thus not only be lost as a product but also become a pollution disposal problem). Thus, this patent contemplates the very condition addressed by the present invention, but teaches away from the present invention and does not even mention the desired reduction of said fines within said shaft furnace.

U.S. Pat. No. 4,886,246 to Maeda et al. describes a largely fluidized bed pre-reduction reactor for achieving, for example, only a quite low 30% reduction of iron ore particles which have a broad range of sizes with a content of from about 20% of coarse material (larger than 5 mm) and about 49% of fines (smaller than 0.5 mm). The final reduction and melting to metallic iron is completed in a separate melter-gasifier. A relatively low grade reducing gas, produced in the melter-gasifier and having a composition for example of $H_2$:14%; $CO$:39%; $CO_2$:21%; $H_2O$:12% and $N_2$:14%, is fed to the pre-reduction reactor through a distributor inclined at greater than the particulate angle of repose at the bottom of said pre-reduction reactor. The velocity of the reducing gas and the shape of the reactor are such that from the full charge of particles fed to the upper portion of the reactor, the fluidized medium sized and the non-fluidized coarsest particles both settle downwardly through a fluidized zone, countercurrent to the upflowing reducing gas, to be withdrawn through preferably one conduit at the bottom of said pre-reduction reactor. The fines are carried over in the partially-spent reducing gas from the top of the reactor into a cyclone separator, which recycles enough of the fines to the reactor to assure sufficient reduction and draws off a portion of the fines for delivery eventually, for example, of 97% of the fines to the melter-gasifier separate from the medium sized and the coarsest particles to the same melter-gasifier.

U.S. Pat. No. 5,762,681 to Lee et al. teaches a method and apparatus for reducing a relatively wide variety of sizes of iron ore fines into metallic iron, which includes a drying/preheating furnace, a primary reduction furnace and two secondary reduction furnaces (one being a high-gas-velocity rector for handling the heavier fines, and the other being a low-gas-velocity rector for handling the lighter fines). This process does not teach use of a moving bed reactor.

U.S. Pat. No. 5,529,291 to Meissner describes a system to process fines as feed material. Meissner shows multiple circulating fluidized beds connected in series capable of reducing iron oxides in the form of fines to metallic iron. No reference was found in this patent's teaching of the processing of fines and coarse particles in a single continuous reactor.

U.S. Pat. No. 5,545,251 to Knop describes the large prevalence of large quantities in the world of fine-particle ores and concentrates and the need for technology for effectively handling these (especially in the poorer ores more widely available). Knop teaches a system of processing fines (but not the coarser particles of 1.0 mm and larger) in a fluidized bed horizontal reactor. In this system, the iron ore fines are blown into the reactor and heated therein by means of coil heat exchangers, passing through successive sections forming fluidized beds separated by partial partitions with intercommunications at the top of the horizontal reactor. The fines overflow the partitions passing from one section to another and finally over the last partition, which defines the sponge iron collecting section. This system assertedly represents an improvement in gas utilization and temperature control of each section forming the horizontal reactor. When particles larger than the range of design are fed into the reactor, said particles cannot overflow from one section to another with the same rate of reducing gas supplied, so this rate has to be controlled and regulated to achieve the desired performance of the equipment.

U.S. Pat. No. 5,560,762 to Bresser et al. describes a system using a fluidized bed in a horizontal rectangular reactor. This system has the advantage of recycling the fine particles carried out by the off gas, to the reduction zone, assuring the complete reduction of the fine particles. This invention describes a reactor wherein particles have to overflow the weirs inside to pass through the different chambers.

U.S. Pat. No. 4,248,623 to Papst et al. describes a system using a non-fluidized moving bed reactor that has a horizontal distributor for cold recycle gas or natural gas in the reduction zone, but which distributor is not for the purpose of being either a fluidizing gas source or being a hot upgraded reducing gas source for the reduction zone (which latter is instead supplied by a separate peripheral hot reducing gas feed).

Other prior art references employing fluidized bed reactors for reduction processing of iron ore fines are: U.S. Pat. No. 3,936,296 to Campbell; U.S. Pat. No. 5,082,251 and U.S. Pat. Nos. 5,370,727 both to Whipp and 5,584,910 to Kepplinger et al.

It has long been desired to have a direct reduction process wherein an iron ore charge with both coarse and fine particles could be processed in one single reactor shaft continuously to achieve high metallization rates with little loss of efficiency as is possible with separate processing of either one alone.

SUMMARY OF THE INVENTION

It is therefore an object of the present invention to provide a basically moving bed method and apparatus yet having the extended capability to reduce effectively and efficiently iron oxide particles having a broad range of sizes, including substantial amounts of fines (or the flexibility to handle any sub-range therein) in a single reduction reactor, particularly to a high degree of metallization.

It is a further object of the present invention to provide method and apparatus for handling in a moving bed reactor pellets and lumps that can have in addition a large percentage of fines without requiring a proportionately large increase in capital equipment for handling such additional fines (and yet is capable even of effectively processing fines exclusively).

It is a yet another object of the present invention to provide method and apparatus optionally capable of handling lumps, ore concentrates, and fines in a single reactor without the need for minimizing the fines present by means of pelletizing or sintering, thus eliminating the cost of such latter steps that are typical in the prior art in the overall production of DRI.

Other objects and advantages of the invention will be evident to those skilled in the art or will be described in this specification of the invention and appended drawings.

According to following preferred embodiments of the present invention, the objects thereof are achieved by providing method and apparatus for producing direct reduced iron by contacting iron-oxide particles, particularly including iron ore fines, in a broad range of sizes with a reducing gas in a reduction reactor having at least one reduction zone. Such reduction zone can comprise at least two sub-zones, the first sub-zone being a fluidized bed of fines and the second sub-zone being a non-fluidized descending moving bed of any coarser particles present and of fines trapped therein.

This is basically a moving bed process that uses an auxiliary, fluidized, bed to permit handling of larger percentages of fines in the feedstock without the detrimental effect that the presence of fines would normally have on the typical prior art moving bed process.

A stream of hot reducing gas, comprising primarily hydrogen and carbon monoxide as reducing agents produced in a manner known in the art is supplied, in the usual moving bed temperature range (e.g. 650° C. to 1050° C., preferably above the usual fluidized temperature range of from 700° C. to 750° C.), through a gas distributor (located at the bottom of the reducing zone and positioned to be in the lower portion of the moving bed of any coarse particles present) thereby defining the bottom of the second reduction sub-zone and serving not only as to reduce the particles in the reduction zone but also as the fluidizing medium in the first reduction sub-zone. The gas distributor has an openwork and gas flow configuration permitting even the coarser particles to pass therethrough and preferably extends horizontally into the reduction reactor to give uniform upward flow of the reducing gas and an even fluidization of the smaller particles (fines) in the first reduction sub-zone. This has the advantage of shortening the required height of the reactor relative to even standard prior art moving bed reactors, because the normal peripheral reducing gas feed in flowing upwardly does not penetrate to the center of the reactor until several meters above the peripheral gas inlet. This height adjustment is not needed when using a horizontal gas distributor. This feature should aid in retrofitting existing prior art DRI reactors to practice the present invention.

The iron-oxide particles are fed into the reduction zone of the reactor above the distributer, preferably into the fluidized bed and more preferably at or near the interface between fluidized bed and the moving bed (i.e. into the lower portion of the fluidized bed in the first sub-zone and just above the moving bed in the second sub-zone). A baffle may be used to achieve much the same effect and/or to increase the residence time of the fluidized particles by lengthening the distance needed to be traveled by fines for discharge from the fluidized bed.

Applicant has found that in his process most of the particles charged to the reactor remain in the moving bed, even though a significant portion of the particles charged may be fluidizable fines. Based on initial test results, it is expected that less than 10% of the fines will be fluidized when practicing the present invention; so long as a moving bed is present (even though the fines may constitute even as much as a quarter of the mass of the charge, or more). For example, in one test the applicant has found that 99.5% of the charge remained in the moving bed even though over 20% of the charge was reliably estimated to be made up of fines of 0.5 mm or less (and over 30% in fact were determined to be fines of less than 1.0 mm; which latter under the conditions of the test normally, in the absence of the bed of coarser particles, would all be fluidized). Thus in the latter test, only about 2.5% of the fluidizable fines were actually fluidized. In contrast, the U.S. Pat. No. 4,886,246 to Maeda (cited above) fluidizes 97% of the lighter fines that constitute 49% of the charge. See columns 7 and 8 which describes a charge, 49% of which constitutes fines of less than 0.5 mm, where 97% of such fines are separated (via discharge line 10*c*) from the coarser materials (via discharge line 4).

This reflects the differences in philosophy and in actuality of the present invention relative to the Maeda patent. Maeda prefers a fluidized bed process (see the bottom of column one) and characterizes his process as "basically of the fluidized-bed type" (see column 4, line 33). He thus teaches apparatus and process that maximizes the fluidized bed handling of the particles (modified in a manner to be capable of handling greater amounts of coarser non-fluidizable particles). The applicant in contrast teaches process and apparatus that has been found to minimize the fluidized bed handling of the particles so as to fluidize only so much of the fines as necessary to have an effective reasonably unclogged moving bed as well as to process (by fluidization) with little or no real loss those lighter fluidizable particles that inevitably escape the non-fluidized bed of particles. Even among the fines actually fluidized it appears that much will ultimately be rejoined with the moving bed for discharge therewith, rather than being discharged from the reactor separately. Applicant thus seeks instead to maximize to the degree feasible the non-fluidized moving bed handling of all sizes of particulate charge.

It is applicant's belief, without wishing to be bound by any particular theory, that by the manner of applicant's feed and handling of the charge so as to force fines as much as possible into the moving bed of coarser particles and retaining such fines within the bed by filtering effect of the larger particles with the gas flow through the moving bed of coarser particles (probably retaining much of the fines trapped behind of the larger particles in the bed by action of eddy currents caused by the gas flow around each of the larger particles) and by normally using less severe gas flow velocities, applicant is thus able to take advantage of the well known efficiencies of the moving bed processes by so emphasizing the moving bed over the fluidized bed processes (yet with the added advantage of being capable of handling increased percentages of fines that prior moving bed processes and apparatus could not do effectively). These advantages include using less process gas (since fewer particles need to be fluidized and at lower velocities) so that the compressor can be smaller, as can the reactor. This also puts less burden on the gas heater. Perhaps even more importantly, the use of the horizontal distributer gives more uniformity of treatment with less chance for channeling and a shorter overall reactor profile (to be contrasted with Maeda, that specifies a cone shaped distributer, or alternatively "a inclined plane grate" and with conventional moving bed reactors that have only peripheral feeds with no internally extending distributor).

The upper limit of the fluidized bed is set by the take-off conduit skimming off the reduced fines that "boil" up from the fluidized bed and overflow therein. The charging of the iron ore particulates into the fluidized bed (preferably to bottom thereof) and the discharge of the reduced fines from the top of the fluidized bed may desirably be offset radially to some degree such that there is a cross flow component added to the overall upflow of the fluidized fines, resulting in still longer residence time for such fines (allowing for more complete metallization to give over 90% metallization, thus helping to avoid the series of cascading fluidized beds so typically required by the prior art to achieve the same degree of reduction). However, this should not be done if the profile of the upper surface of the moving bed of coarse particles so lopsided as to result in unacceptably uneven reduction of the particles. To avoid this in a commercial scale installation, there can be multiple feed conduits and offset multiple takeoff conduits. The rate of skimming removal of fluidized particles from the reactor can be adjusted by conduit sizing or even valving as another way to adjust favorably the residence time of the fines in the fluidized bed. To allow the desirable "height" of the moving bed to be above said distributor, sensing means may be installed and connected to control the feeding of iron ore to the reduction zone, and/or the discharge of the reduced coarse material. Adjusting the height of the moving bed affects the height of the fluidized bed and thus the residence time of the fluidized particles. The velocity of the reducing gas can also affect these same factors. Said reducing gas preferably has a velocity typical in the art for maintaining DRI fluidized beds, which, for example, normally is at least capable of maintaining in the fluidized state those particles having a size approximately 1.0 mm or below, said particles usually being called the fines (most of which are in the 0.1 mm to 1.0 mm range). Preferably the velocity would be about 0.5 m/s to 0.7 m/s (as contrasted with Maeda's 7.0 m/s for fluidizing 0.5–5.0 mm particles and even 5.0 m/s for fluidizing the fines of 0.5 mm or less).

The majority of the reducing gas components when fed to the reactor should be reducing gases ideally with at least a third more hydrogen than carbon monoxide, which again serves to assure more complete reduction of the fluidized fines for a given residence time. The coarse particles (usually larger than 1 mm, with most less than 10 mm), which form the moving bed, react with the reducing gas and continue to be processed in a manner known in the art. As known in the art, this size division between the moving bed and the fluidized bed particles can vary somewhat in practice (some such art include as fluidized particles those of a size up to 6 mm). The fluidized bed is designed to have a residence time sufficient to allow the desired reduction of the iron-ore (preferably to a metallization of well over 50% and more typically on the order of at least 90%, with a preferred metallization of over 95%). For example, at 760° C. a residence time of 15–30 minutes gave a 95% metallization. Similar results with less residence times have been obtained at over 900° C. With certain ores and/or with passivation coating (such as Portland cement, $Mg(OH)_2$, etc., at least on the coarser particles) fines can be reduced at temperatures up to 1050° C. without detrimental agglomeration (even though the prior art suggests that such sticking and agglomeration begins at about 760° C.), which increased temperature would significantly reduce the residence time required. The temperature at which agglomeration of the fines begins varies greatly depending upon the ore source.

The fine particles are collected after their reduction and sent via a conduit at least initially separate from the discharge stream of said coarse reduced particles, but preferably to be joined with the discharge stream of said coarse reduced particles such that the combined reduced particles are handled thereafter in one or more of the several manners known in the art. To improve the downstream flow of the coarse reduced particles (which include a higher percentage of fines than is typically found in the standard prior art moving bed processes), a countercurrent stream of a suitable gas may need to be injected to each discharge outlet from the reactor. This can be 1 to 5% of the reducing gas. This gives mobility to the moving bed at the narrowed discharge outlet to prevent an arched blockage. This can also be eased by increasing the angle of the discharge cone its outlet diameter.

The hot reducing gas after reacting with the iron-oxide ore is withdrawn from the reactor from above the fluidized bed as the off gas. Said off gas can still contain the lighter fines. The lighter fines with a size above about 0.1 mm are separated in a solid particles separator (normally a cyclone separator) and are recycled to the reduction zone (to eventually accumulate sufficiently to be discharged from the reactor along with the other fines forming the fluidized bed). The fines with size below 0.1 mm can be separated in a second solid particles separator connected to the exiting gas of the first solids separator. These lightest particles are withdrawn from the system and can be sent to a micropelletizing system or for another treatment and then be recycled to the reduction zone; or can be sent for disposal. Alternatively, if the percentage of such fines is sufficient, a separate wholly-fluidized bed reduction chamber with a separate lower velocity gas distributor can be added to the top of the main reduction chamber (see FIG. 4).

To increase efficiency, the off gas can be fed to a preheater (such as to a cyclone for heat exchanging) to warm the particles being charged to the reactor. Once the reduced material is discharged, it can be sent still-hot to an electric arc furnace, cooled, hot briquetted, or otherwise treated in a manner known in the art to best fit the necessities of the site.

Even though this invention can be performed under atmospheric pressure conditions, it is preferably performed at several atmospheres (e.g. up to about 5), since the operation of the system becomes more efficient. Operating under such high pressure conditions allows increasing the mass of reducing gas fed to the system for a specific gas velocity, thus supplying more reducing agents for the same gas flow rate.

BRIEF DESCRIPTION OF THE DRAWINGS

In this specification and in the accompanying drawings, some preferred embodiments of the invention are shown and described and various alternatives and modifications thereof have been suggested; but it is to be understood that these are not intended to be exhaustive and that many changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF PREFERRED EMBODIMENTS OF THE INVENTION

Figure 1:
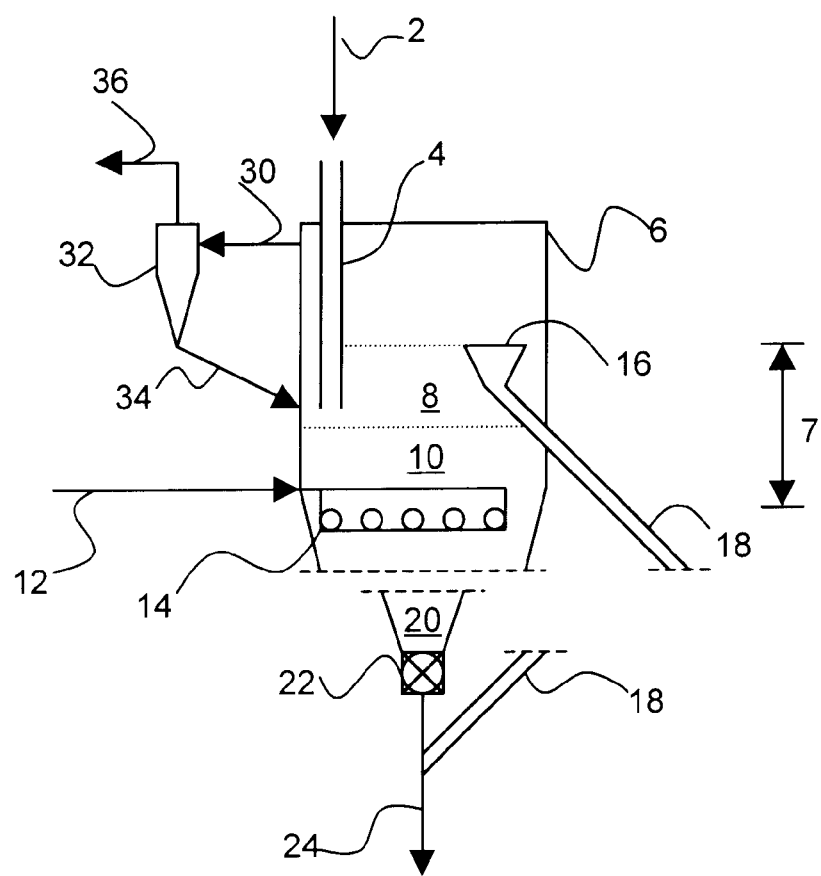
FIG. 1 shows schematically a preferred embodiment of the present invention, illustrating the dual zone moving bed/fluidized bed feature of the invention process and apparatus for producing DRI.
Figure 5:
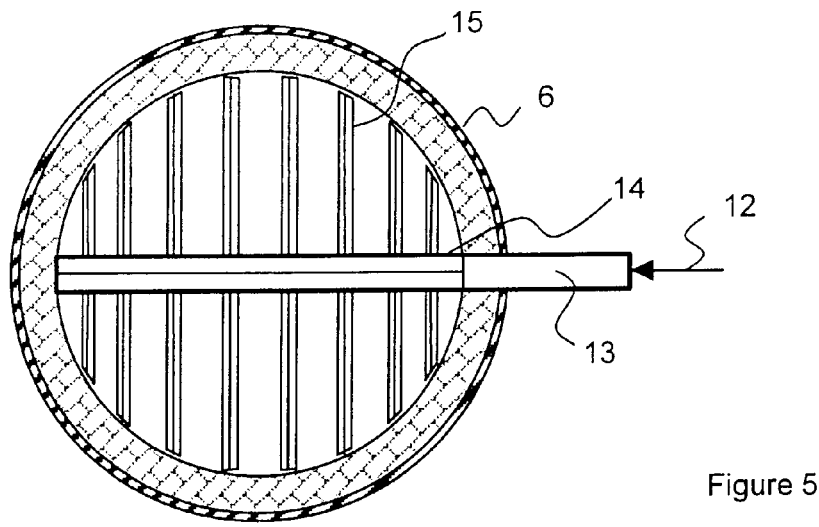
FIG. 5 shows a horizontal sectional view of a reduction reaction of the type illustrated in the preceding figures, showing the main gas distributor at the base of the reducing zone.
Figure 6:
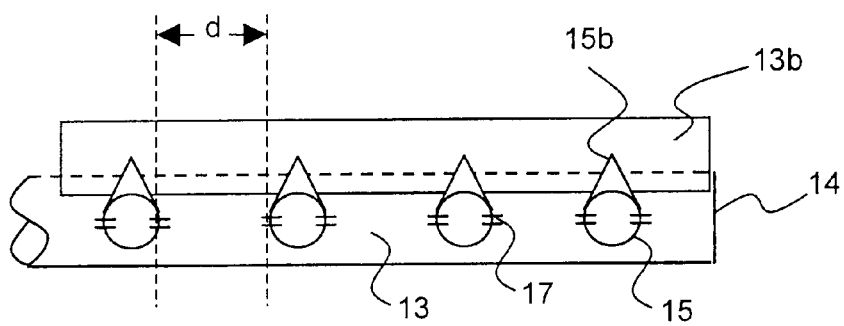
FIG. 6 shows a side elevational view of the gas distributor of FIG. 5, showing the pipe structure of the distributor.

FIG. 1 shows schematically a preferred embodiment of the invention. The iron-oxide ore particles 2 are charged to the reducing zone 7 of a reduction reactor 6 through a feed conduit 4. Said reduction zone 7 comprises a fluidized bed 8 (the first reduction sub-zone), that portion 10 (the second reduction sub-zone) of the moving bed above the discharge zone 20, and at the bottom thereof a gas distributor 14, preferably located to extend horizontally into the reduction reactor 6 (see FIGS. 5 & 6). Said gas distributor 14 as illustrated is made up of a central supply pipe 13 with a parallel array of perpendicularly-attached pipes 15 with equi-spaced holes 17 in their sides for evenly supplying to the moving bed the fluidizing reducing gas received via stream 12 from a reducing gas producing and/or recycling system (preferably such as system 108, described below, in the description of FIG. 3 or the alternative earlier systems described in the patents cited above; for example, U.S. Pat. Nos. 4,336,063 and 4,528,030, among others). The pipes 13 and 15 are respectively topped by protective angle irons 13b and 15b, which also facilitate the flow of the coarse particles therepast.

The reducing gas stream 12 is mainly comprised of hydrogen and carbon monoxide as reducing agents, but preferably composed mainly of hydrogen. The gas distributor 14 functions to distribute the reducing gas necessary to reduce the iron-oxide ore particles into sponge iron and to deliver an upward gas flow of sufficient velocity to maintain the fluidized bed 8. The coarse material comprising particles typically bigger than on the order of 1 mm (up to about 10 mm, and normally not more than 51 mm, i.e. 2 inches) forms the moving bed 10 (and, in this invention, normally includes a substantial portion of the fines trapped therein as well). Said moving bed flows downwardly from the second reducing sub-zone 10 through the 6 inch spacings "d" between piping 15 of the distributor 14 (see FIGS. 5 and 6) and on into at least one discharge zone 20.

The gas exiting said reduction zone 7 of the reduction reactor 6 as reactor off gas stream 30, is treated in the solids separator 32, usually a cyclone, where for example, solid particles bigger than on the order of 0.1 mm return to the reactor 6 through conduit means 34 (typically to fluidized bed 8, or optionally to moving bed 10 to better trap the fines therein). Thus in this embodiment, the fluidized bed 8 would then be composed of particles from 0.1 mm up to 1 mm. The cyclone off gas 36 is sent for a subsequent treatment (such as for upgrading and recycling as in system 108, etc., see FIG. 3). Reduced coarse particles pass through a dosification means 22 (such as the rotary valve in U.S. Pat. Nos. 3,710,808 and 4,427,136 and WO 97/35130) and on to a discharge stream 24. The particles comprising the fluidized bed 8, after being preferably substantially reduced, are collected by collecting means 16 (shown as an upwardly open funnel) and then are conducted downwardly through conduit means 18 preferably to join the discharge stream 24 to be combined together with said coarse particles.

Figure 4:
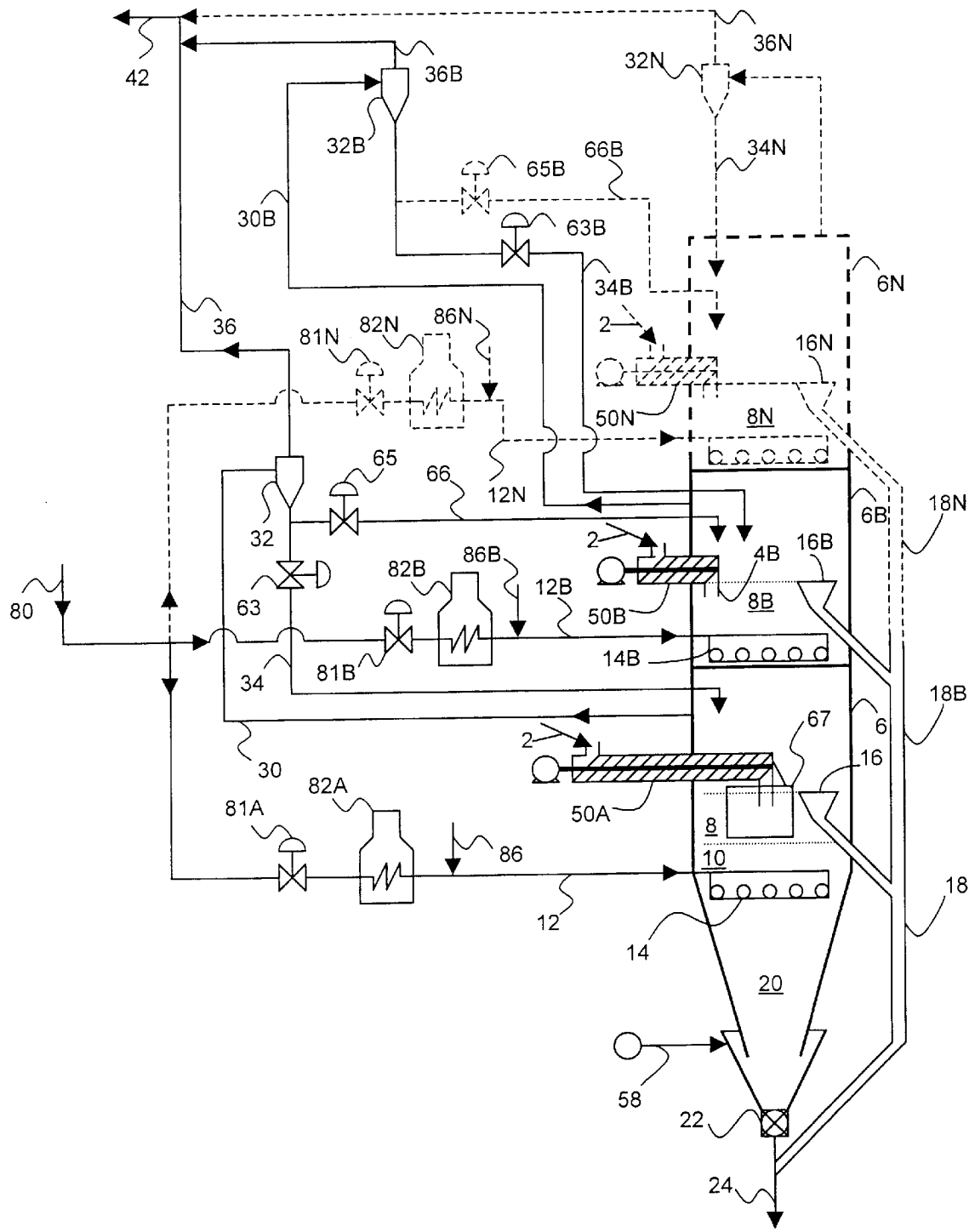
FIG. 4 shows schematically yet another preferred embodiment of the present invention, similar to the preceding figures but with modifications particularly including at least one separate upper chamber to the reduction reactor for supplemental fluidized reduction of lighter fines with a lower velocity reduction treatment with gas from a second separate gas distributor.

Although this invention preferably functions as a moving bed reactor able to accommodate fines in an auxiliary fluidized bed; nevertheless, the reactor advantageously can handle quite adequately a charge composed only of fines (particularly in the embodiment in FIG. 4).

Figure 2:
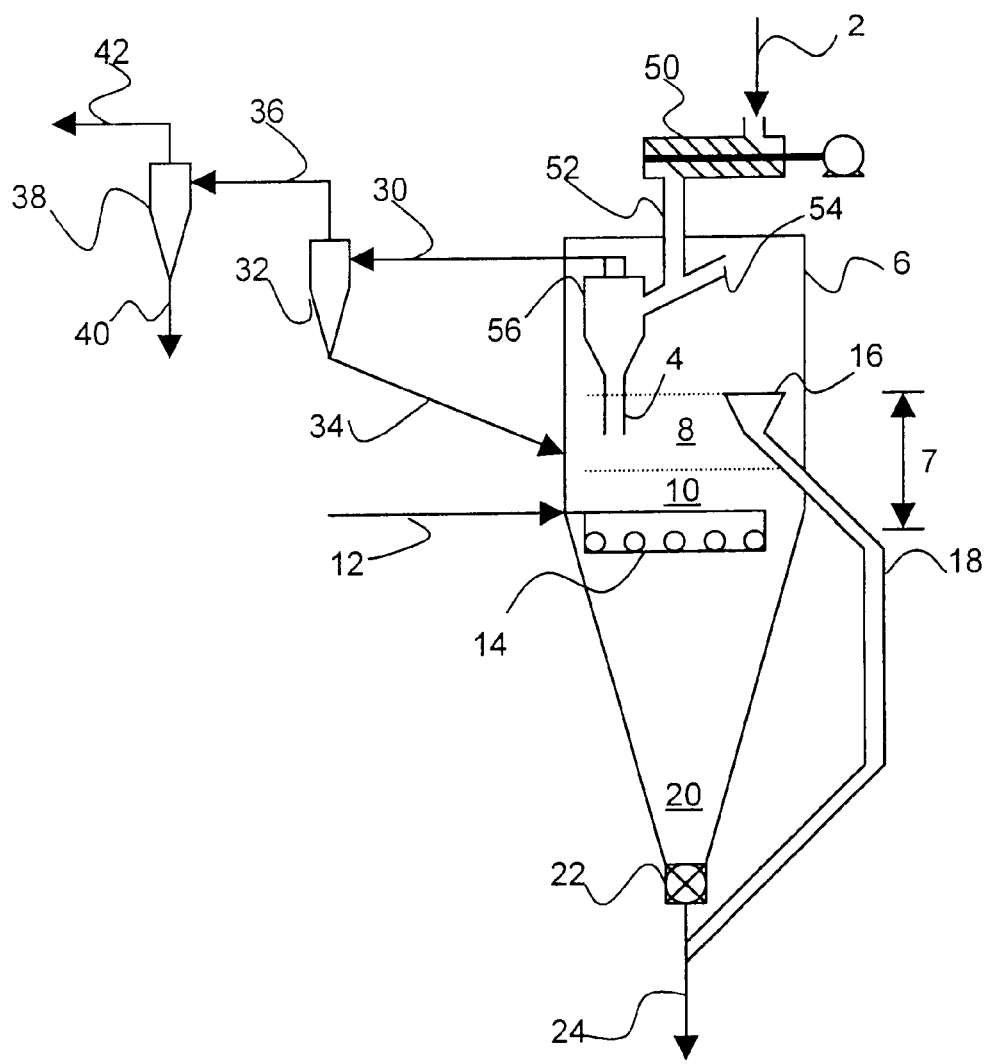
FIG. 2 shows schematically an alternative preferred embodiment of the present invention, similar to FIG. 1 but with a modification including a screw feed mechanism and a pre-heater.

FIG. 2 schematically shows another embodiment of the present invention based on FIG. 1, where the iron-oxide-containing particles 2 are fed by means of a screw feeder 50 through conduit means 52 to the reduction reactor 6. The conduit means 52 has a gas entrance 54 to let the off reducing gas of the reactor (from above the fluidized bed 8) contact and thus pre-heat the particles 2. Conduit means 52 is connected to a preheater 56, usually in form of a cyclone, which promotes intimate contact and subsequent separation of the off reducing gas and the particles, ultimately discharging said particles into the reduction zone 7 in the single reactor 6. Apart from the feed mechanisms 50 etc. and the pre-heater 56 reactor 6 functions as described above with respect to FIG. 1.

The gas exiting preheater 56 as stream 30 is treated in the solids separator 32 where, as in FIG. 1, solid particles bigger than 0.1 mm return to the system through conduit means 34. The cyclone off gas 36 from the first solids separator, first cyclone 32, in this embodiment passes to a second solids separator, second cyclone 38, where particles below 0.1 mm are sent via discharge conduit 40 for other treatment (such as micro-pelletizing and recycling; or subsequent reduction via line 66 in a separate fluidized bed 8B, see FIG. 4) or disposal. The clean off gas 42 from cyclone 38 is conducted to a system to produce and/or recycle reducing gas (such as system 108, etc.).

Figure 3:
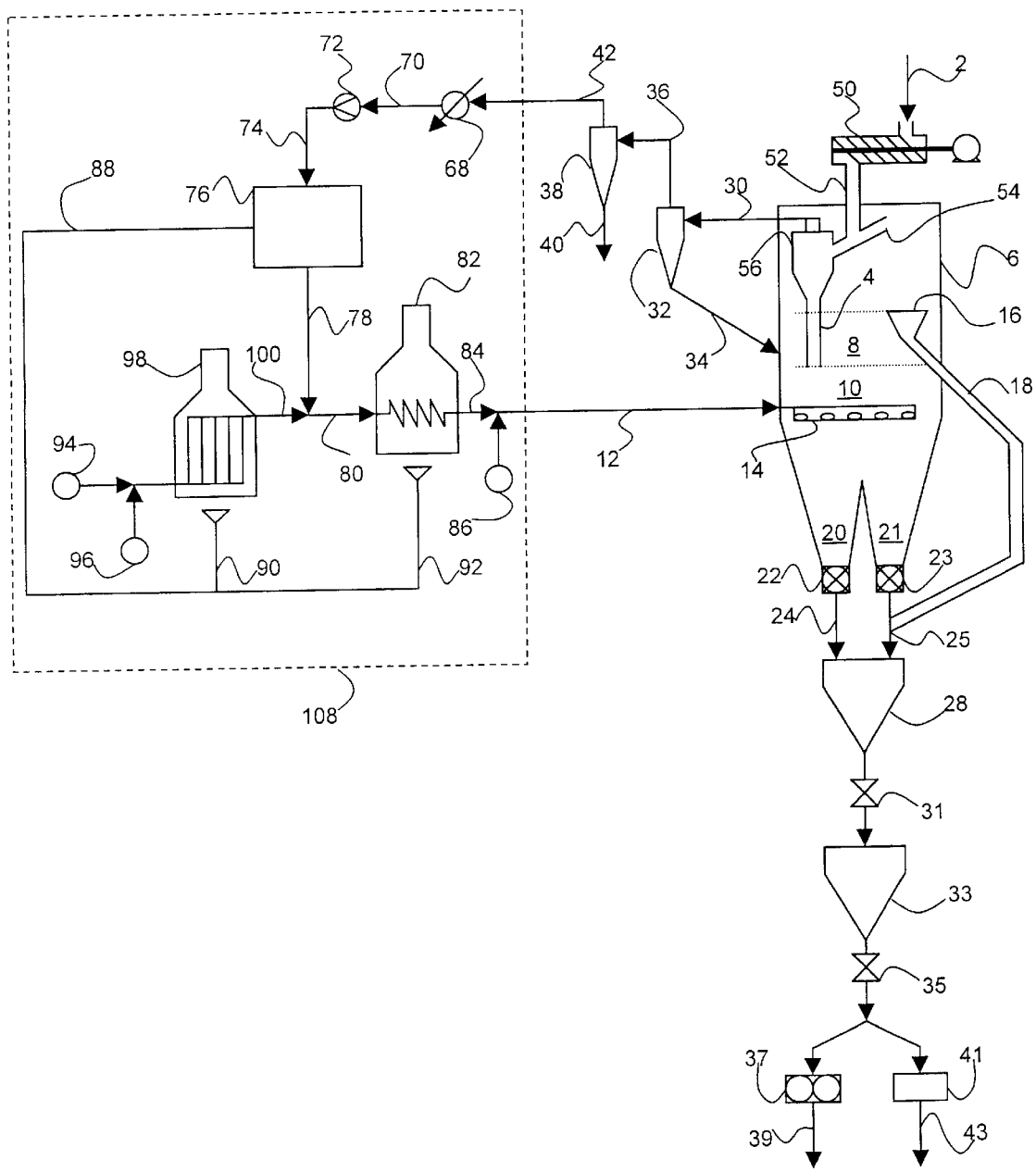
FIG. 3 shows schematically still another alternative preferred embodiment of the present invention, similar to FIG. 2 but with two discharge zones and an example of one of many reducing gas sources and recycle systems.

FIG. 3 schematically shows another preferred embodiment (which also shows exemplary peripheral equipment for DRI discharge (28 et seq.) and for reducing gas production and/or recycle (108), that can be used with any of the embodiments in FIGS. 1, 2, and 4, as well). This differs particularly from of the embodiments shown in FIGS. 1, 2, and 4 by the coarse reduced particles being discharged through two discharge zones 20 and 21 respectively. Each discharge zone has its own dosification means 22 and 23 respectively which in turn discharge through conduit means 24 and 25 respectively to a common hopper 28. From hopper 28, the reduced material passes through valve means 31 and is discharged to hopper 33, which with valve means 31 and 35 forms a depressurization discharge system. After this latter system, the reduced material can be sent to a hot briquetting system 37 to produce hot briquetted iron 39, or can be sent to a cooling system 41 to discharge the cooled sponge iron 43 to the ambient atmosphere, or can be discharged directly still hot to refining equipment such as an electric arc furnace, or otherwise (all in a manner known in the art).

FIG. 3 also illustrates the preferred placement of the discharge of the feed conduit 4 at the interface of the fluidized bed 8 and the moving bed 10. Although only one feed conduit 4 and only one take-off collecting means 16 is illustrated, it will be understood that in larger commercial installations a number of such conduits and collectors can be employed (so as to ensure that a relative level upper surface of the moving bed is achieved and maintained and effective skimming of the reduced fines is achieved). Also although the collector 16 is illustrated as a funnel, it could be series of peripheral openings in the wall of the reactor at the take-off level.

Described hereinafter is the reducing gas producing and recycling system 108. The off reducing gas stream 42 from the last of the separators (the second cyclone separator 38 in FIG. 3), passes through a cooling and cleaning system 68 (typically a water quench cooler) and then passes on via conduit 70 through a compressor 72, a stream 74, and on through a hydrogen separator system 76. The hydrogen separator system 76 is preferably of the type with pressure swing adsorption or vacuum pressure swing adsorption (referred as PSA and VSA respectively; see for example U.S. provisional application No. 60/075,313); although it could alternatively be of the type well known in the art using a chemical absorption unit (see for example U.S. Pat. No. 4,714,597, issued Dec. 22, 1987). The stream 78, comprised mainly of hydrogen, is combined with the make-up reducing gas stream 100 from reformer 98 to form stream 80. Stream 80 is heated by heater 82 to a temperature in the range from 650° C. to 1050° C. to form stream 84. Stream 84 can be the same as stream 12, or optionally can be combined with an oxygen-containing gas stream 86 to raise the temperature (by partial oxidation) of stream 84 from the heater 82 to the final desired temperature, if required, prior to its introduction as stream 12 through gas distributor 14. The make up reducing gas stream 100 is formed by the combination of natural gas 94 and steam 96 and their reaction through gas reformer 98. The stream 88 with low hydrogen content exits the hydrogen separation unit 76 and can be used via conduits 90 and 92 to heat the reformer 98 and the heater 82, respectively. Other recycle/reformation systems well known in the art can be substituted for system 108 (such as employing $CO_2$ removal units in lieu of the $H_2$ separation unit 76) a reformerless system can alternatively be used, such as in U.S. Pat. Nos. 4,528,030 or 5,858,057.

FIG. 4 schematically shows still another preferred embodiment similar to FIG. 2, but showing a supplemental fluidizing chamber 6B formed on top of the main reactor 6. This houses an auxiliary reducing zone 8B that serves to reduce lighter fines, such as those bigger than 0.1 mm, that come from the off gas 30 of reactor 6, being recovered by the cyclone separator 32, and being diverted by open valve 65 via return line 66 to auxiliary reducing chamber 6B (instead of being returned to the main reactor 6 via valve 63 and line 34, which latter would be the mode for operating as in FIGS. 1 to 3). The reducing gas from line 12B feeds to a separate distributor 14B to supply fluidizing gas at a lower velocity in bed 8B, which can be better suited to handling such lighter fines. If still lighter fines remain a problem these can be handled in yet another supplemental fluidizing chamber 6N (whose dotted parts are illustrated in dotted lines and have like reference numbers but with the "B" portion of such references replaced by an "N"). These auxiliary chambers 6B and 6N would be quite small relative to the main reactor 6, since the height could be as small as 2 to 4 feet or even less (given the smaller volume of fines and the lower velocities involved). It is possible alternatively merely to widen the diameter of the main reactor, but this would obtain only a fixed reduced gas velocity for the lighter fines (similar to what is done in Maeda) and would not have the greater flexibility available by use of the auxiliary chamber(s) 6B with its independent distributor.

The screw feed 50A may be the only feed needed in this embodiment illustrated in FIG. 4. However, the auxiliary screw feed 50B can be furnished to give greater flexibility, by making it possible for the reduction chamber to be independent of supply from reactor 6, with proper valve adjustment (such as by closing valves 65 and 65B and opening valve 63B).

Figure 7:
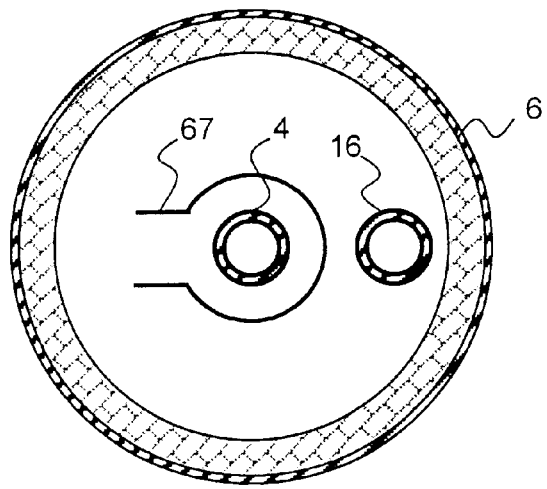
FIG. 7 shows a side horizontal sectional view similar to FIG. 5 but taken at the level in the reduction reactor of the fluidized sub-zone showing a central feed pipe surrounded by a baffle and offset from a fines collecting conduit.

Also illustrated in FIG. 4 is a gas stream 58 fed to the discharge zone of the reactor 6 which can serve to aid in preventing the arched blockage discussed above. See also the baffle 67 (shown as well in FIG. 7), whose purpose is to prolong the residence time of the fine in the fluidized bed 8, and also probably aids in forcing fines into the moving bed 10.

EXAMPLES

In pilot plant tests of structure most like FIG. 1, the following results were obtained:

TABLE 1

| Size (mm) | | Test (%) | |
| --- | --- | --- | --- |
| Lower | Upper | C1 | C2 |
| 0.000 | 0.149 | 0.6312 | 0.5003 |
| 0.149 | 0.210 | 0.3506 | 0.3502 |
| 0.210 | 0.250 | 1.5529 | 1.6508 |
| 0.250 | 0.420 | 9.1501 | 9.4550 |
| 0.420 | 0.841 | 19.4864 | 19.4773 |
| 0.841 | 1.700 | 31.0080 | 29.7458 |
| 1.700 | 3.200 | 37.8208 | 38.8206 |

From this table, it can be seen that the percentage of fines available for the fluidized bed is 31.1712 (in the 0.00–0.841 size range) for test C1, and 31.4338 for test C2. A velocity of 0.6 m/s were needed to suspend 0.5 mm particles and 3.8 m/s to blow this size out of the reactor (while a velocity of 2.8 m/s suspended 5.0 mm particles and 12 m/s to blow these away). From the foregoing table the calculated estimated distribution of particles for test C2 would be 21.7% for 0.00–0.50 mm and 78.3% for 0.50–5.00 mm.

The following is typical of the reducing gas used during the pilot plant testing:

TABLE 2

| Component | Test 1 % Volume | Test 2 % Volume |
| --- | --- | --- |
| $H_2$ | 75.66 | 69.19 |
| CO | 6.70 | 14.39 |
| $CO_2$ | 2.38 | 2.59 |
| $CH_4$ | 11.97 | 10.40 |
| $N_2$ | 0.47 | 0.61 |
| $H_2O$ | 2.82 | 2.82 |

What is claimed is:

1. A method for reducing iron-oxide-containing particles present in a broad range of sizes, including fines, to metallic-iron-containing particles in a reducing zone of a moving bed reduction reactor with a reducing gas mainly composed of hydrogen and/or carbon monoxide at a substantially non-agglomerating reducing temperature range, said method comprising:

(a) introducing said iron-oxide-containing particles into said reducing zone to form a non-fluidized moving bed of particles in the lower portion of said reducing zone and extending down into a discharge zone of the reactor;

(b) injecting said reducing gas into said moving bed, to define thereabove a moving bed second reducing sub-zone, at a regulated velocity sufficient to create and maintain immediately above said moving bed a first reducing sub-zone in the form of a fluidized bed composed of particle fines;

(c) withdrawing from the reactor an overflow of the metallic-iron-containing particle fines from the top of said fluidized bed;

(d) withdrawing from the non-fluidized moving bed in said discharge zone the reduced metallic-iron-containing particles, including fines; and, (e) withdrawing the spent reducing/fluidizing gas from above said fluidized bed in said reducing zone.

2. A method according to claim 1, wherein said reducing gas is injected into said reactor through a distributor extending across said reactor with an openwork permitting a moving bed descending flow of particles therethrough from said reducing zone thereabove to said discharge zone therebelow thereby forming a plurality of gas jets in an array for supplying a uniform upward flow of fluidizing/reducing gas through the reducing zone.

3. A method according to claim 2, wherein said moving bed is formed by particles of at least between about 0.5 and about 1.0 mm and said fluidized bed is formed of particles smaller than about 1.0 mm to about 0.1 mm.

4. A method according to claim 1, wherein said spent reducing gas and said fines overflowed from the fluidized bed are withdrawn separately from the reactor.

5. A method according to claim 3, wherein the temperature of said reducing gas is in the range between about 650° C. to about 1050° C.

6. A method according to claim 5, wherein said reducing gas is mainly composed of hydrogen and carbon monoxide as reducing agents.

7. A method according to claim 5, wherein said reducing gas contains more than about 80% in volume of hydrogen as one of its components.

8. A method according to claim 4, further comprising separating in a cyclone the withdrawn spent reducing gas from the lighter fines entrained therein and recycling the latter fines to said reduction zone.

9. A method according to claim 4, further comprising separating in a cyclone the withdrawn spent reducing gas from the lighter fines entrained therein and recycling the latter fines to an auxiliary fluidized bed reducing zone furnished with a lower velocity reducing/fluidizing gas.

10. A method according to claim 5, wherein the residence time of said particles forming said fluidized bed is between about 12 to about 30 minutes.

11. A method according to claim 2, wherein the composition of said reducing gas on a dry basis and percent volume is: $H_2$:50% to 60%; CO:30% to 37%; $CO_2$:2% to 3.5%; $CH_4$:1% to 3%; $N_2$:0% to 1.5% and the rest being other hydrocarbons and inert gases.

12. A method according to claim 6, wherein the composition of said reducing gas also contains methane as one of its components.

13. A method according to claim 2, wherein said iron-containing particles at least from said moving bed are cooled at a temperature below to 100° C., before they are withdrawn from said reduction reactor, by circulating a stream of cooling gas in said discharge zone in contact with said iron-containing particles.

14. A method for according to claim 6, wherein said reducing gas is produced by the combination of natural gas and steam in a steam reformer.

15. A method for according to claim 2, wherein a portion of the spent reducing gas is upgraded and recirculated to the reduction reactor.

16. A method for according to claim 15, wherein said spent gas is upgraded by treatment in a hydrogen separation unit and the subsequent recirculation of hydrogen to the reduction reactor as a portion of the recirculated reducing gas.

17. A method for according to claim 16, wherein said hydrogen separation unit is a Pressure Swing Adsorption unit.

18. A method for according to claim 16, wherein said hydrogen separation unit is a Vacuum Pressure Swing Adsorption unit.

19. A method for according to claim 15, wherein said spent gas is upgraded by removal of carbon monoxide by a chemical absorption unit.

20. A method for according to claim 5, wherein said iron-oxides-containing particles are preheated by means of an internal cyclone within said reduction zone of the reduction reactor.

21. A method for according to claim 20, Wherein the lightest particle fines entrained in the spent reducing gas are separated therefrom and recirculated to said fluidized bed.

22. A method for according to claim 2, wherein said iron-oxides-containing particles are fed to said reactor through an external cyclone which contacts such last-mentioned particles with said spent reducing gas.

23. A method for according to claim 12, wherein the rate of withdrawal of particles from the moving bed in the discharge zone is so that the top level of said moving bed in said reduction zone is maintained at a set level.

24. A method for according to claim 2, wherein a suitable gas stream is injected into the moving bed of particles at the outlet of a conically shaped discharge zone to facilitate the downward flow of said particles through said reactor.

25. A method according to claim 2, wherein said iron-oxide-containing particles are introduced directly into the fluidized bed in said first reducing sub-zone.

26. An apparatus capable of reducing a broad size range of iron-oxide-containing particles, including fines, to metallic-iron-containing particles in a reducing zone with a reducing gas mainly composed of hydrogen and/or carbon monoxide at a substantially non-agglomerating reducing temperature range; said apparatus comprising:

(a) a vertical reduction reactor having a reducing zone, with an upper fluidized first reducing sub-zone and a lower non-fluidized moving bed second reducing sub-zone, and a discharge zone thereunder;

(b) a reducing gas distributor extending across said reactor with an openwork permitting a moving bed descending flow of particles therethrough from said reducing zone thereabove to said discharge zone therebelow and having a plurality of jets in an array for supplying a uniform upward flow of fluidizing/reducing gas through the reducing zone;

(c) a regulated iron-oxide-containing particles feed pipe system having at least one feed conduit positioned to feed such particles into said reducing zone with a capacity to feed at a rate at least helping to maintain a moving bed of at least coarser particles in said discharge zone and in the lower portion of said reducing zone;

(d) a hot reducing gas source for supplying said reducing gas through said distributor up into said reducing zone at a velocity capable of maintaining a fluidized bed of lighter particles in the reducing zone above the distributor and immediately on top of the portion of any moving bed of said particles present in the reducing zone;

(e) a fluidized metallic-iron-containing particles collecting overflow system having at least one inlet, with all such inlets being spaced at a height sufficiently above the distributor to enable maintenance of said moving and fluidized beds in said reducing zone such that the reduced lighter particles from said fluidized bed would overflow into said collecting overflow system;

(f) at least one off reducing gas outlet in said reducing zone positioned spaced above said inlets of said collecting overflow system; and (g) a reduced particle discharge system for removing reduced particles from any moving bed of particles present in said discharge zone.

27. An apparatus according to claim 26, wherein said distributor is a horizonal regular array of spaced pipes having said gas jets spaced therealong.

28. An apparatus according to claim 26, further comprising a cyclone separator connected to said off reducing gas outlet with a solids return conduit for recycling the fine particles separated from said off reducing gas to a reducing zone.

29. An apparatus according to claim 26, further comprising a variable rate moving bed particles discharging device connected to said outlet system of said reactor discharge zone, for regulating the rate of discharge of said particles from any moving bed in said reducing zone to at least help in maintaining the top level of the moving bed in the reducing zone at a given height to assure adequate moving bed residence time in the reducing zone for attaining at least a 50% metallization of the particles from the moving bed.

30. An apparatus according to claim 28, further comprising a particles preheater device incorporated in said feed pipe system.

31. An apparatus according to claim 26, further comprising a particles preheater in the form of a cyclone separator located inside the upper portion of the reducing zone of the vertical reactor with its gas intake positioned to draw off reducing gas from such upper portion and also to separate and preheat the iron-oxide-containing particles and with the preheater's solids output conduit feeding into the fluidized zone and the preheater's gas output function as the off reducing gas outlet from said reducing zone.

32. A method according to claim 26, further comprising a separate reducing chamber on said reactor having a separate reducing gas distributor system for supplying lower velocity reducing/fluidizing gas to at least an auxiliary fluidized bed in said separate chamber, and a cyclone separator connected to said off reducing gas outlet from the main reducing zone with a solids return conduit for recycling fine particles separated from said off reducing gas into said separate reducing chamber.

33. A method according to claim 4, wherein said iron-oxide-containing particles are introduced to said reactor at the interface between said moving bed in the second reducing sub-zone and said fluidized bed in the first reducing sub-zone.

34. A method according to claim 2, wherein the injecting of said reducing gas into said moving bed is at a velocity sufficient to separate coarser particles in said reducing zone from normally-entrained particle fines and also enough additional particle fines to permit the non-fluidized moving bed to be reduced more efficiently and evenly and to maintain immediately above said moving bed said first reducing sub-zone in the form of a fluidized bed composed of such separated particle fines while minimizing separation from the coarser particles in the moving bed of unnecessary amounts of particle fines.

35. A method for according to claim 25, wherein the areas of introduction of the particles fed to the reactor are remotely located relative to the areas of withdrawal of the fines from the fluidized bed by radial offset and by intervention of a baffle.

36. A method according to claim 5, wherein said reducing gas is at least partially obtained by partial oxidation of natural gas.

37. An apparatus according to claim 26, said overflow system, being at least one pipe, has its inlets spaced at a height above the feed conduit outlets which latter open into the fluidized bed first sub-zone.

* * * * *

UNITED STATES PATENT AND TRADEMARK OFFICE
CERTIFICATE OF CORRECTION

PATENT NO.    : 6,224,649 B1
DATED         : May 1, 2001
INVENTOR(S)   : Juan A. Villarreal-Trevino Page 1 of 1

It is certified that error appears in the above-identified patent and that said Letters Patent is hereby corrected as shown below:

Column 1,
Line 7, replace "This is a continuation-in-part of application Ser. No." by -- This application claims priority benefit from the following applications, being a continuation-in-part of copending application Ser. No. --;

Column 6,
Line 15, replace "reduction" by -- metallization --;

Column 7,
Line 15, after "discharge cone" insert -- and/or --;

Column 8,
Line 40, replace "below," by -- below --;
Line 41, replace "Fig. 3" by -- Fig. 3, --; and Column 10,
Line 32, after "desired temperature" insert -- (by partial oxidation) --.

Signed and Sealed this

Eighteenth Day of December, 2001

Attest:

Attesting Officer

JAMES E. ROGAN
Director of the United States Patent and Trademark Office